United States Patent [19]

Miller

[11] Patent Number: 4,777,845

[45] Date of Patent: Oct. 18, 1988

[54] CRANKSHAFT AND CONNECTING ROD ASSEMBLY

[75] Inventor: Gary T. Miller, Amherst, N.Y.

[73] Assignee: General Motors Corporation, Detroit, Mich.

[21] Appl. No.: 46,600

[22] Filed: May 7, 1987

Related U.S. Application Data

[63] Continuation-in-part of Ser. No. 889,270, Jul. 25, 1986, abandoned.

[51] Int. Cl.$^4$ .......................... G05G 1/00; F16C 3/04; F02B 75/32
[52] U.S. Cl. ................. 74/579 E; 74/579 R; 74/597; 123/197 AC
[58] Field of Search .............. 74/595, 597, 579 E, 74/579 R, 579 F, 580; 123/56 BC, 197 AC, 197 AB, 56 BB; 29/156.5 A

[56] References Cited

U.S. PATENT DOCUMENTS

| | | | |
|---|---|---|---|
| 3,131,577 | 5/1964 | Wilson | 74/597 |
| 3,487,818 | 1/1970 | Dineen | 123/197 AC |
| 3,608,396 | 9/1971 | Bentley | 74/597 |
| 4,026,252 | 5/1977 | Wrin | 123/197 AC |
| 4,078,450 | 3/1978 | Vallejos | 123/197 AC |
| 4,622,864 | 11/1986 | Fetouh | 74/597 |

FOREIGN PATENT DOCUMENTS

| | | | |
|---|---|---|---|
| 0025908 | 2/1977 | Japan | 123/197 AC |
| 349455 | 11/1960 | Switzerland | 123/197 AC |
| 329980 | 5/1930 | United Kingdom | 74/595 |
| 809093 | 2/1959 | United Kingdom | 74/596 |
| 920952 | 3/1963 | United Kingdom | 74/596 |
| 978679 | 12/1964 | United Kingdom | 123/197 AC |

*Primary Examiner*—Gary L. Smith
*Assistant Examiner*—Vinh Luong
*Attorney, Agent, or Firm*—R. L. Phillips

[57] ABSTRACT

A crankshaft and connecting rod assembly comprises a driver having a crank lobe with a shank received in a radial slot through a shaft so as to be driven thereby. The crank lobe has an inner side that operably contacts the shaft and an outer side that operably contacts a bore in a connecting rod and the shank has an end that also operably contacts the bore. The outer side of the crank lobe and the end of the shank each have a semi-circular cylindrical surface and these surfaces are located diametrically opposite each other and have a common axis eccentric and parallel to that of the shaft and a radius substantially equal to that of the bore whereby upon shaft rotation the crank lobe through sliding contact with the bore drives the connecting rod while the end of the shank slidingly follows the bore and cooperates with the crank lobe to prevent radial movement of the driver on the shaft to thereby maintain such drive.

5 Claims, 1 Drawing Sheet

CRANKSHAFT AND CONNECTING ROD ASSEMBLY

This is a continuation-in-part of U.S. Ser. No. 889,270, filed 7/25/86 abandoned.

TECHNICAL FIELD

This invention relates to crankshaft and connecting rod assemblies and more particularly to the construction of multipiece crankshafts.

BACKGROUND OF THE INVENTION

In the construction of crankshafts, it is common practice to form them in one piece by machining bar stock or forgings or castings and also, but to less extent, to fabricate them with an assemblage of one or more crank lobes and shaft parts. With the former approach, the fact that there is eccentricity can lead to both manufacturing and performance problems. For example, considerable machining is normally required when making the crankshaft from barstock and special patterns and dies are required with castings and forgings. Moreover, expensive specialized machine tooling is required whether bar stock, castings or forgings are used. In addition, it is difficult to hold tight tolerances since the part is not balanced when rotated during machining. On the other hand, with a fabricated crankshaft, there is the difficulty in accurately assembling and holding the crank lobes on the shaft. Furthermore, all the above crankshafts are not inherently balanced and as a result can shorten bearing life or require the use of a counterbalance.

SUMMARY OF THE INVENTION

The present invention provides a simple cost effective solution for the case where an eccentric circular crank lobe would normally be used to operate in a cylindrical bore of a connecting rod. The present invention takes the fabrication approach in utilizing a shaft on which one or more crank lobes are assembled but wherein the crank lobes are now formed as a cam-like driver. And instead of fixing the latter thereto such as with splines, a keyway, press fit, welding and the like as has been done, they are formed with a shank that is received in a radial slot through the shaft. Each crank lobe has an inner side that contacts the shaft and an outer side that contacts a circular cylindrical bore in the respective connecting rod. In addition, the shank has an end that projects slightly beyond the shaft and contacts the connecting rod bore. The crank lobe's outer side and the shank end each have a semi-circular surface located diametrically opposite each other and have a common center eccentric to that of the connecting rod bore and a radius substantially equal to that of the bore. Upon rotation of the shaft, the crank lobe through sliding contact with the bore drives the connecting rod with a stroke equal to the radial distance between the crank lobe's inner and outer sides while the shank end slidingly follows the bore and cooperates with the crank lobe to prevent radial movement of the driver on the shaft to thereby maintain same together and thus the crank drive.

DESCRIPTION OF PREFERRED EMBODIMENT

These and other objects, advantages and features of the present invention will become more apparent from the following description and drawing in which.

Figure 1:
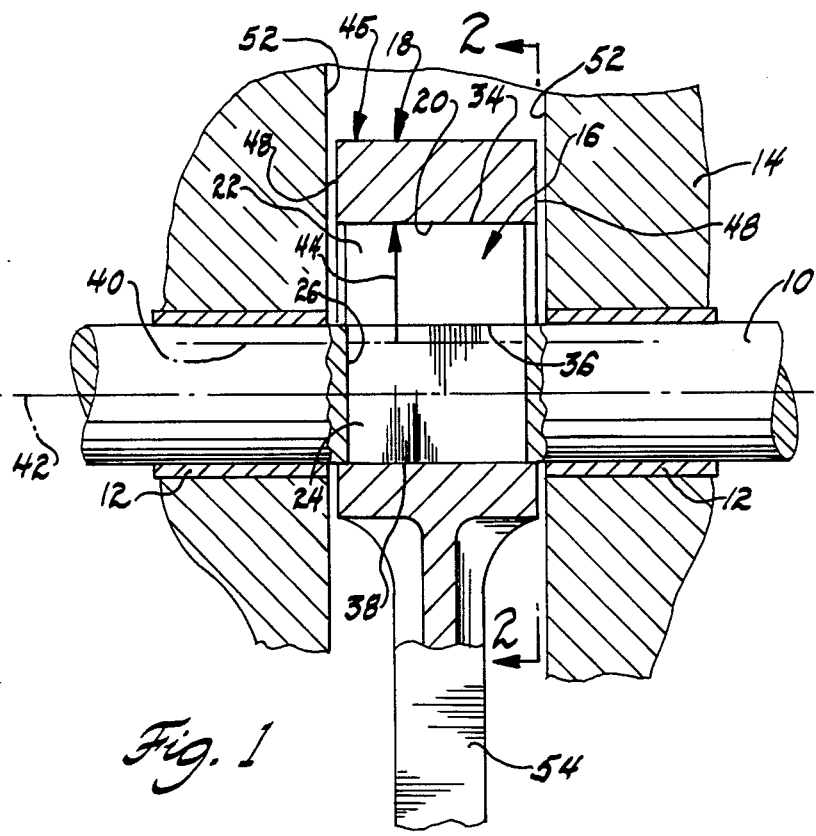
FIG. 1 is a longitudinal sectional view of the preferred embodiment of the crankshaft and connecting rod assembly according to the present invention.

Referring to the drawing wherein the same numbers are used to identify the same parts in the various views, there is shown in FIG. 1 a crankshaft and connecting rod assembly comprising a shaft 10 rotatably mounted in bearings 12 in a support structure 14, one or more drivers 16 mounted on the shaft, and a connecting rod 18 driven at one end by each of the drivers and connected at another end to in turn drive a reciprocating piston (only one driver and the driven end of the one connecting rod being shown). The shaft extends between the bearings through a circular cylindrical bore 20 of larger diameter in each connecting rod with the associated driver assembled therein. The drivers each comprise a crank lobe 22 with a shank 24 received in a radial slot 26 through the shaft at an axial location within the connecting rod bore. The shank slidably fits in the slot for ease of assembly and the shank and slot have a rectangular cross section with side-to-side contact at one or the other of their respective wide sides 28 and 30 depending on the direction of shaft rotation to transmit rotary drive from the shaft to the driver (see FIG. 2).

The crank lobe 22 has an outer side 34 that contacts the follower bore and an inner side 36 extending on opposite sides of the shank and along a chordal plane that contacts the shaft on opposite sides of the slot. And the shank has an end 38 extending slightly past the shaft that also contacts the connecting rod bore. The outer side 34 of the crank lobe and the end 38 of the shank each have a semi-cylindrical surface and these surfaces are located diametrically opposite each other and have a common axis 40 eccentric and parallel to the shaft axis 42 and a radius 44 substantially equal to that of the connecting rod bore (i.e. the bore radius minus a dimensional allowance to provide a rotary sliding fit of the driver in the follower bore).

The connecting rod has a head 45 having parallel flat sides 48 at opposite ends of the bore that are slidably received between parallel flat guide surfaces 52 in the support structure whereby the connecting rod is thus axially contained for oscillatory reciprocative movement at right angles to the shaft and driver axes. In addition, the connecting rod has a rod portion 54 extending from its head to transmit such motion to the piston (not shown) requiring reciprocating motion.

The crank lobe which has the shape of a chordal section of a circular cylindrical disc operates upon shaft rotation in either direction and through sliding contact with the cylindrical connecting rod bore to drive the connecting rod to reciprocate with a stroke substantially equal to the difference between the diameters of the shaft and connecting rod bore while the shank end slidingly follows the bore and cooperates with the crank lobe to prevent radial movement of the driver on the shaft to thereby maintain the crankshaft drive without further fastening between the shaft and driver.

Figure 2:
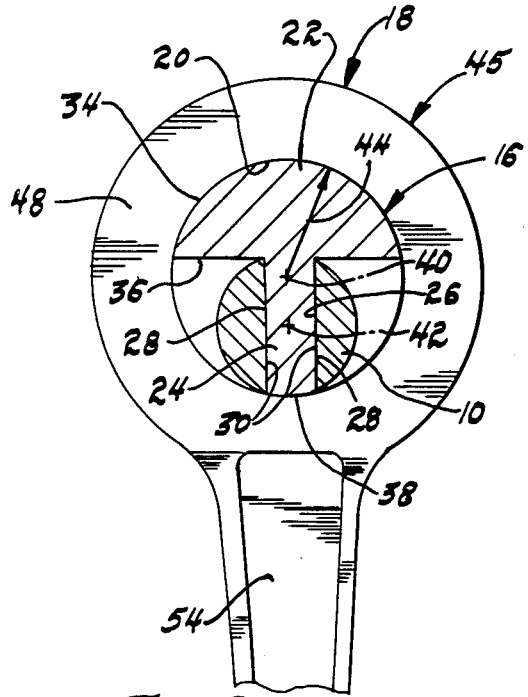
FIG. 2 is a view taken on the line 2—2 in FIG. 1.
Figure 3:
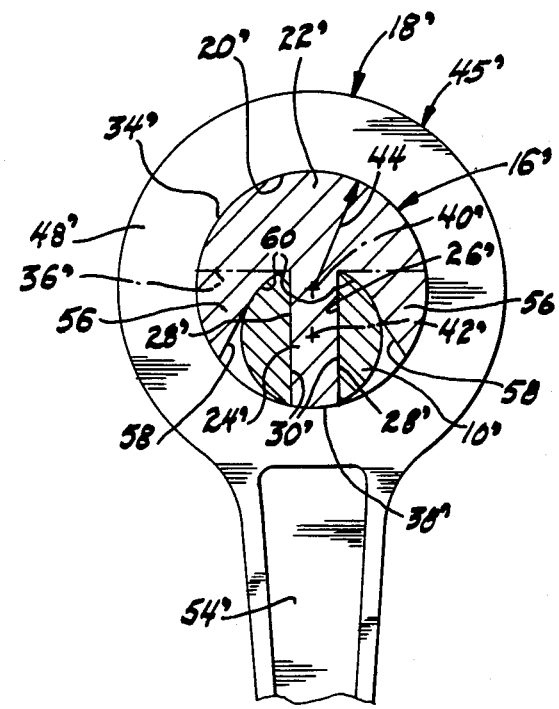
FIG. 3 is a view similar to FIG. 2 but of another embodiment of the driver.

Referring to FIG. 3 wherein the same numbers only primed are used to identify parts similar to those in FIGS. 1 and 2 and new numbers are used to identify added structure, there is shown another embodiment of the driver that provides greater support for the side loading forces. In this embodiment, the outer side 34 of the driving crank lobe 22' of the driver 16' is extended on opposite sides of the shank 24' with arcuate shaped sections 56 that extend from the formerly flat inner side 36' now shown in phantom line. The inner side 58 of these added lobe sections extends about the shaft 10' and now has a concave cylindrical surface 60 on opposite sides of the shank that has substantial area contact with the shaft. And the outer side 34' with the addition of these lobe sections now extends past its axis 40' at least to and preferably beyond the shaft axis 42' as shown so as to extend the cylindrical surface of this outer side from less than a 180° arc as in FIG. 2 to beyond a 270° contacting the connecting rod bore 20'. As a result, the unit side loading on the driving crank lobe is substantially reduced as compared with that in FIG. 2.

It will thus be appreciated that the crankshaft and connecting rod are easily assembled and that the shaft may be simply made from bar stock by turning, grinding and slotting while the mushroom-shaped driver in both embodiments can be simply made as a separate molded, extruded or machined part. Moreover, because they are separate parts, they can be made of different materials best suited to their specific functions. And functionally, the shaft is inherently balanced since the driver(s) though eccentricly arranged to rotate with the shaft are not mechanically fixed thereto.

The above described preferred embodiment is illustrative of the invention which may be modified within the scope of the appended claims.

The embodiments of the invention in which an exclusive property or privilege is claimed are defined as follows:

1. A crankshaft and connecting rod assembly comprising a rotatable shaft having a substantially constant diameter, a connecting rod, said connecting rod having a circular cylindrical bore therethrough larger in diameter than said diameter of said shaft and receiving said shaft, and a driver having a crank lobe with a shank received in a radial slot through said shaft so as to be driven thereby, said crank lobe having an inner side that operably contacts said shaft and an outer side that operably contacts said bore, said shank having an end that operably contacts said bore, said outer side of said crank lobe and said end of said shank each having a semi-circular cylindrical surface, said cylindrical surfaces located diametrically opposite each other and having a common axis eccentric and parallel to that of said shaft and a radius substantially equal to that of said bore whereby upon shaft rotation said crank lobe through sliding contact with said bore drives said connecting rod to reciprocate with a stroke substantially equal to the difference between the diameters of said shaft and bore while said end of said shank slidingly follows said bore and cooperates with said crank lobe to prevent radial movement of said driver on said shaft to thereby maintain said drive.

2. A crankshaft and connecting rod assembly comprising a rotatable shaft having a substantially constant diameter, a connecting rod, said connecting rod having a circular cylindrical bore therethrough larger in diameter than said diameter of said shaft and receiving said shaft, and a driver having a crank lobe with a shank of rectangular shape received in a radial slot of corresponding shape through said shaft so as to be driven thereby, said crank lobe having tne shape of a section of a circular cylindrical disk with a inner side that operably contacts said shaft on opposite sides of said shank and an outer side that operably contacts said bore, said shank having an end that operably contacts said bore, said outer side of said crank lobe and said end of said shank each having a semi-circular cylindrical surface, said cylindrical surfaces located diametrically opposite each other and having a common axis eccentric and parallel to that of said shaft and a radius substantially equal to that of said bore whereby upon shaft rotation said crank lobe through sliding contact with said bore drives said connecting rod to reciprocate with a stroke substantially equal to the difference between the diameters of said shaft and bore while said end of said shank slidingly follows said bore and cooperates with said crank lobe to prevent radial movement of said driver on said shaft to thereby maintain said drive.

3. A crankshaft and connecting rod assembly as defined in claim 2 wherein the cylindrical surface of said outer side of said crank lobe extends over an arc greater than 180°.

4. A crankshaft and connecting rod assembly as defined in claim 2 wherein the cylindrical surface of said outer side of said crank lobe extends over an arc greater than 270°.

5. A crankshaft and connecting rod assembly as defined in claim 4 wherein said inner side of said crank lobe has a concave cylindrical surface on opposite sides of said shank that contacts said shaft.

* * * * *